FIG. I

Sept. 24, 1957  F. G. DUNNINGTON  2,807,798
FREQUENCY INDICATOR

Filed Dec. 18, 1945  7 Sheets—Sheet 2

FIG. 2

INVENTOR
FRANK G. DUNNINGTON

BY

*M. O. Hayes*

ATTORNEY

Sept. 24, 1957     F. G. DUNNINGTON     2,807,798
FREQUENCY INDICATOR Filed Dec. 18, 1945     7 Sheets-Sheet 3

DETECTION OF $\frac{F}{2}$ SUB HARMONIC BY 1-1 SWITCHING

FIG. 3

DETECTION OF $\frac{F}{3}$ SUB HARMONIC BY 1-2 SWITCHING

FIG. 4

INVENTOR
FRANK G. DUNINGTON
BY
ATTORNEY

Sept. 24, 1957 F. G. DUNNINGTON 2,807,798
FREQUENCY INDICATOR
Filed Dec. 18, 1945 7 Sheets-Sheet 4

FIG. 5

INVENTOR
FRANK G. DUNNINGTON
BY
M. O. Hayes
ATTORNEY

Sept. 24, 1957 F. G. DUNNINGTON 2,807,798
FREQUENCY INDICATOR
Filed Dec. 18, 1945 7 Sheets-Sheet 6

FIG.6

INVENTOR
FRANK G. DUNNINGTON
BY
M. O. Hayes
ATTORNEY

Sept. 24, 1957     F. G. DUNNINGTON     2,807,798
FREQUENCY INDICATOR Filed Dec. 18, 1945     7 Sheets—Sheet 7

INVENTOR
FRANK G. DUNNINGTON

BY *M. O. Hayes*

ATTORNEY

United States Patent Office 2,807,798
Patented Sept. 24, 1957

2,807,798

FREQUENCY INDICATOR

Frank G. Dunnington, Belmont, Mass., assignor, by mesne assignments, to the United States of America as represented by the Secretary of the Navy Application December 18, 1945, Serial No. 635,787

11 Claims. (Cl. 343—5)

This invention relates to electrical apparatus for the analysis of complex electrical waveforms, and in particular to a frequency indicator for responding to the predominant frequency present in such a waveform and for detecting and indicating the presence in significant strength of coexistent frequencies sub-harmonically related to the said predominant frequency.

Although not limited to such an application, this invention was developed to meet requirements connected with the art of detecting and indicating primary and secondary propeller-modulation frequencies present in the envelopes of radar pulse echoes from propeller-driven aircraft.

Early in the development of radar techniques it was observed that successive radar echoes reflected from a propeller-driven aircraft varied continuously in amplitude at a rate harmonically related to the speed of rotation of the plane's motor, due to the fact that the amount of power reflected from the plane at any instant depended upon the attitude of the plane's propeller at that instant. Thus it was found that the envelope of a succession of radar pulse echoes from a propeller-driven aircraft could be detected and studied for information concerning this aircraft.

This pulse envelope has a rather complete waveform, containing components of random variation, known in the art as "noise," and numerous harmonics of the frequency of rotation, W, of the plane's propeller shaft. (In most planes W will lie between ten and forty revolutions per second.) The predominant modulation frequency, F, will be one of the harmonics and will be equal to NW, where N is the number of blades of the propeller. This results from the fact that for any position of an N-bladed propeller there will be N−1 other positions each of which is practically indistinguishable from the original position. While the shaft is going through a full revolution, then, the propeller blades will go through N aspect cycles, all very similar to each other.

Present in the modulation envelope there may also be a small amount of the shaft-rotation frequency, W, and its harmonics resulting from any small natural asymmetry of the propeller blades and other similar causes. This amount will normally be very small compared to the amount of the predominant frequency present. It is possible, however, by a special treatment of the propeller blades, to increase the magnitude of this frequency component, W, and its harmonics to significant strength, thus introducing into the modulation envelope what is in effect the $$\frac{1}{N}$$

subharmonic of the predominant propeller modulation frequency, F. Other subharmonics may be similarly introduced. With a four-bladed propeller, for example, the ½ subharmonic may be introduced instead of the ¼ subharmonic, depending upon which blades are treated. In order to interpret the information contained in the envelope of pulses reflected from a plane approaching a radar set, and especially in order to interpret such information in time to act on it, it is necessary to employ means for readily and quickly detecting and analyzing the complex waveform constituted by this envelope. In particular, it is necessary to employ some device which will respond to and indicate the presence in this envelope of a predominant frequency lying in the range of propeller-modulated frequencies, and which will also indicate the presence in significant strength of one or more secondary frequencies subharmonic to the said predominant frequency. Satisfactory devices for detecting the envelope of a series of amplitude-modulated pulses, known as "boxcar generators," have already been developed. The foremost problem to be solved is the handling of the complex waveform in such a manner as to accomplish the aforementioned objectives.

Previous means for accomplishing these objectives involved the simultaneous presentation of all frequencies between relevant limits present in the waveform, by means of a set of frequency meters utilizing calibrated vibrating resonant metal reeds, driven electromagnetically. Thus all frequencies present, lying within the said relevant range, will be observed simultaneously. Two major disadvantages of this method are that the reeds are also caused to vibrate by noise voltages present in the waveform, and that the predominant frequency itself tends to fade out at short intervals, confusing the observer who tries to discriminate visually between significant and random vibrations over the spectrum covered by the reeds. It is also difficult within the limits of accuracy of such an instrument, to ascertain whether or not the harmonic relationship between the supposed primary modulation frequency and secondary modulation frequencies is exact and definite.

It is accordingly an object of this invention to provide a frequency indicator which will analyze complex and fluctuating waveforms.

It is another object of this invention to provide a frequency indicator which will test waveforms for the presence of any predominant frequency.

It is a further object of this invention to provide a frequency indicator which will test for the presence of subharmonic frequencies.

It is a still further object of this invention to provide a frequency indicator from whose presentation the presence or absence of a predominant frequency and any subharmonic frequencies will be readily evident to an observer, even when the waveform analyzed contains a considerable amount of noise.

It is another object of this invention to provide an IFF system for distinguishing between friendly and enemy propeller-driven aircraft by analyzing the propeller modulation characteristics of radar echoes.

To accomplish the foregoing general objects, and other more specific objects which hereinafter appear, this invention resides in certain circuit elements and their relation to one another, as are more particularly described in the following specification. The specification is accompanied by drawings in which:

In all of the operational descriptions which follow, it will be assumed that the waveform being analyzed is the envelope of a series of radar pulse echoes from an aircraft whose propeller has been treated, as above suggested. The predominant frequency present in the waveform as primary modulation will then be the fundamental frequency, F. Present also will be secondary modulation at some particular subharmonic of the fundamental frequency, F/2, F/3, F/4, etc. and integral multiples of said subharmonic.

The magnitude of the secondary modulation will be some percentage fraction of the primary modulation, hereinafter called "percent secondary modulation." This percentage will usually lie between 10% and 60%.

Figure 7:
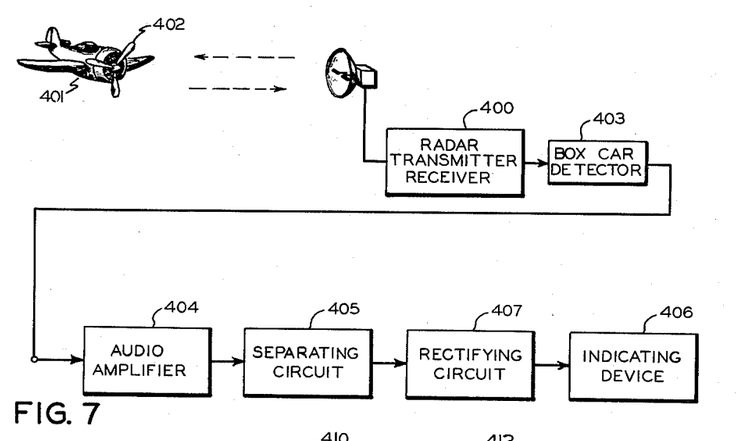
Fig. 7 is a simplified block diagram generic to the three forms of the invention shown in Figs. 1, 2, and 6.

Referring now to Fig. 7 propeller modulated radar echoes are received by a conventional radar transmitter-receiver 400 from an aircraft 401 having one propeller blade 402 coated with a material that is relatively non-reflective to radio waves. The envelope of the video echo pulses produced by the receiver is detected in a box car detector 403 and preferably applied to an audio amplifier 404. The output of the audio amplifier, which contains fundamental and subharmonic frequency components of propeller modulation, is next applied to a circuit 405 which separates the two frequency components. Signals obtained at the output of the separating circuit 405 are ultimately used to operate an indicating device 406 which responds to the presence and coexistence of the fundamental and subharmonic frequencies. Since most indicating devices require the rectification of an applied alternating signal, a rectifying circuit 407 may be included as shown. If no response showing coexistence is obtained, it can be presumed that the aircraft under observation does not have any blades of its propeller coated with non-reflecting material. Hence the invention may be employed in an IFF system to distinguish between friendly and enemy aircraft.

Figure 8:
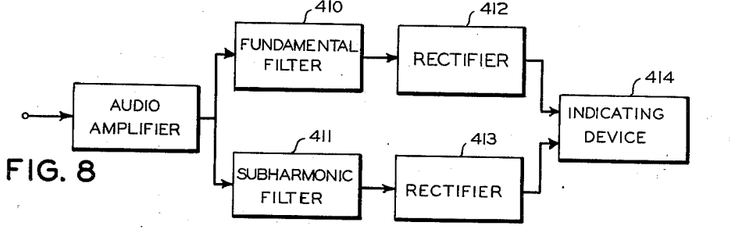
Fig. 8 is a simplified block diagram of the form shown in Fig. 6.

Fig. 8 shows a simplified block diagram like the lower half of Fig. 7, but in which the separating circuit consists of bandpass filters 410 and 411 which pass only the fundamental and subharmonic components respectively. The filter outputs then cause separate rectifiers 412 and 413 to apply control voltages to an indicating device 414. The latter gives one kind of indication if only the fundamental component is present, and another kind of both fundamental and subharmonic components are present simultaneously.

Figure 6:
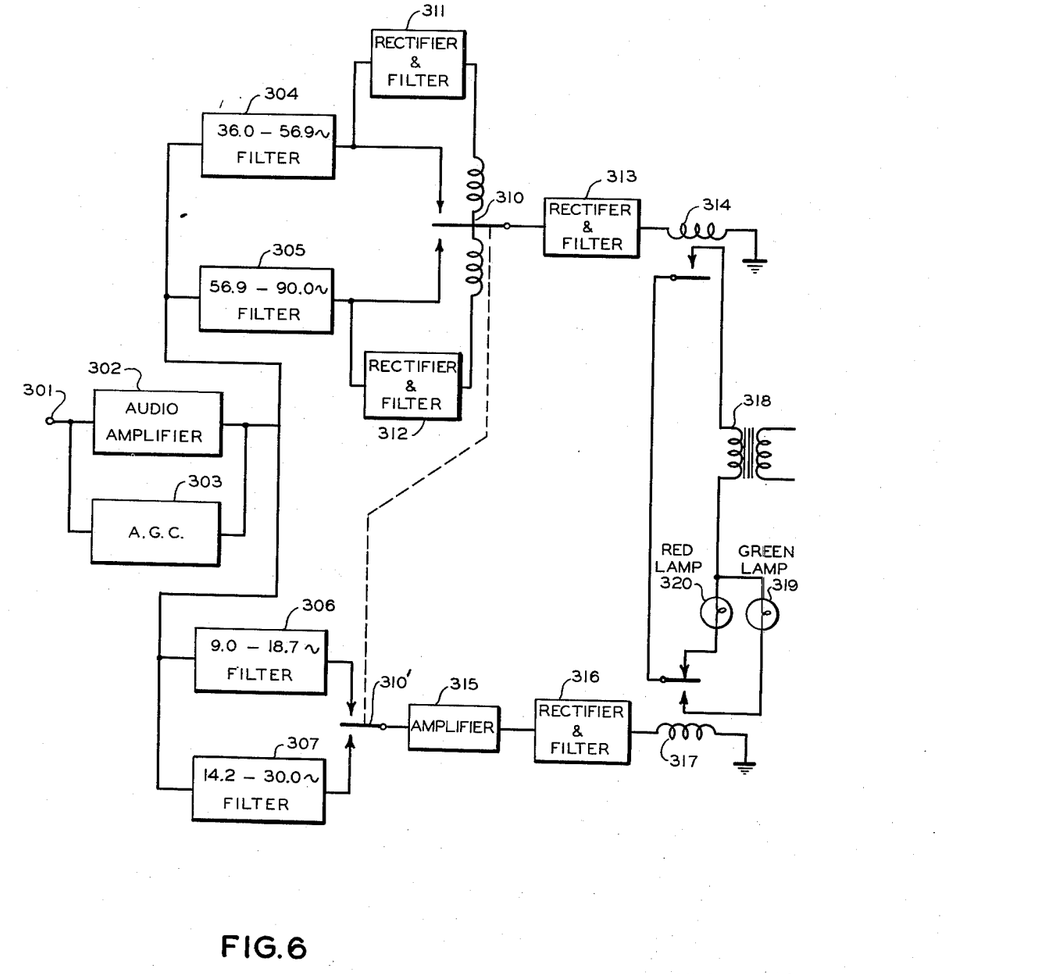
Fig. 6 is a block diagram of still another form of this invention.

This form of the invention is shown in greater detail in Fig. 6, referring to which the output of the box car detector (not shown in Figs. 6 and 8 but shown in Fig. 7) is applied to terminal 301. This output contains the fundamental and subharmonic frequency components produced in the envelope of the video pulses by the previously described propeller modulation. These signals are next passed through an audio amplifier 302, which is under the control of a high gain automatic gain control (sometimes abbreviated AGC) circuit 303 in order to stabilize the amplifier output level.

The output of the audio amplifier is then applied to the four bandpass filters 304, 305, 306, and 307. Filters 304 and 305 are designed to pass fundamental frequencies, in this case lying in the bands 36 to 56.9 cycles per second (C. P. S.), and 56.9 to 90 C. P. S., respectively. Filters 306 and 307 are designed to pass the subharmonic modulation frequencies, in this case lying in the bands 9 to 18.7 C. P. S. and 14.2 to 30 C. P. S., respectively. As will later appear, only one filter of each pair is used at any one time, thus retaining the advantage of a narrow band filter in excluding much noise, yet accommodating a wide range of propeller speeds. The particular frequency combinations named are merely illustrative and not in limitation of the invention.

It is evident that filters 304 and 305 can pass only fundamental modulation frequencies, and that filters 306 and 307 can pass only subharmonic modulation frequencies. Any subharmonic frequency associated with a fundamental frequency lying between 36.0 and 56.9 C. P. S. will pass through the companion band-pass filter marked 9.0 to 18.7 cycles per second. Correspondingly, filter 305 works together with filter 307. It might be mentioned here that the probability of existence of a particular subharmonic will depend on such factors as the number of propeller blades and permissible propeller shaft rotation speeds of conventional aircraft. Hence it is not necessary that the band pass filters be designed to accept every possible subharmonic.

A differential relay 310 is operated by the competing filter 304 and 305, through rectifiers 311 and 312, thus choosing the filter channel in which the stronger fundamental frequency component lies. This same relay has additional contacts 310' which choose the corresponding subharmonic modulation filter. The stronger primary frequency thus passes to a rectifier and filter 313 whose output operates relay 314. Likewise the subharmonic frequency component is passed through an amplifier 315 and to a rectifier and filter 316 whose output operates relay 317. If the two frequencies exist simultaneously in the original input signal the two relays 314 and 317 are energized, thus applying voltage from transformer 318 to a green indicator lamp 319. If only the fundamental modulation frequency exists the red lamp 320 is illuminated. Thus a positive identification of the existence of subharmonic modulation frequencies is provided, enabling the operator to distinguish between an aircraft suitably treated to produce such effects and one which is not.

The rectifier and filter combinations shown as blocks 311, 312, 313, and 316 employ conventional circuits. For example, an infinite impedance type detector can be chosen as the rectifier, and a conventional resistance capacitance network as the filter. The function of these combinations is solely to convert the respective modulation frequency components to direct current in order to operate the associated relays as described. The remaining filters and amplifiers of Fig. 6 are of conventional design.

Figure 9:
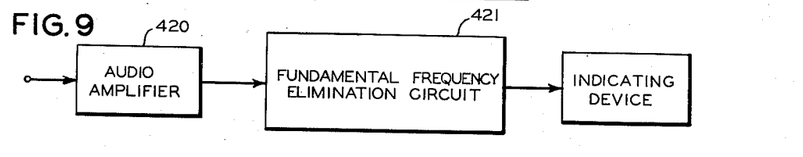
Fig. 9 is a simplified block diagram pertaining to the forms shown in Figs. 1 and 2.

Fig. 9 shows a simplified block diagram of other forms of the invention in which the separation of the fundamental and subharmonics includes elimination of the fundamental. As before, the output of the box car detector (403 in Fig. 7) is applied to an audio amplifier 420 (Fig. 9). The amplified fundamental and subharmonic frequency components are next fed to a circuit 421 which eliminates the fundamental frequency but not the subharmonic. This function is accomplished by combining successive cycles of the fundamental frequency component in a manner to be subsequently described.

Figure 1:
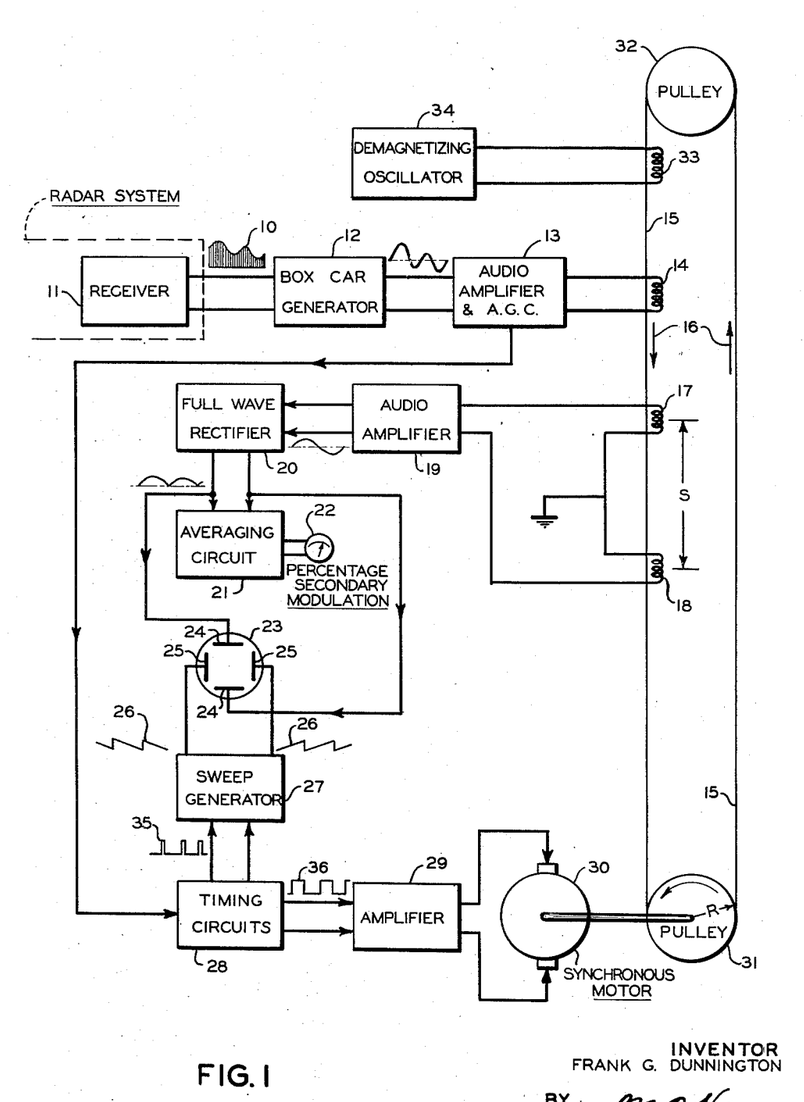
Fig. 1 is a block diagram of one form of this invention.

This form of the invention is shown in greater detail in Fig. 1, referring to which the box car generator is shown at 12, and detects the modulation frequencies present in the envelope of the echo pulses from a radar receiver 11. These frequencies are next passed to an audio amplifier 13, containing a very strong automatic gain control circuit, and the resultant signal output is fed to a magnetic recording coil 14, and recorded magnetically upon a moving metal tape 15. In this form of the invention a portion of the signal to be analyzed is shifted in phase by exactly one cycle of the fundamental frequency (through use of the moving metal tape), is inverted, and is then combined with a portion of the incoming signal which has not been so treated. As a result, the fundamental frequency component will be canceled out, leaving the desired subharmonic components.

The metal tape is made to move, by means hereinafter described, in a direction indicated by arrows 16, and passes through pick-up coils 17 and 18, in which it induces voltages reproducing the signal output of audio amplifier 13. The two pick-up coils 17 and 18 are wound in opposite polarity. Their outputs are fed into an audio amplifier 19 in which they are mixed and amplified and from which they are fed into a full-wave rectifier 20. The output of this rectifier is fed to two indicating devices, either of which or both may be used. One of these devices comprises an averaging circuit 21 in which the signal output of rectifier 20 is filtered free of all components except the direct current component, and a meter 22 which indicates the amount of said direct current component. The other indicating device comprises an oscilloscope 23, to the vertical plates 24 of which is fed the signal output of the full wave rectifier 20, and to the horizontal plates 25 of which is fed a sawtooth sweep 26, from a sweep generator 27 synchronized as hereinafter described.

The output from audio amplifier 13 is fed also to timing circuits 28, which respond to the predominant frequency present in the waveform applied to them, and deliver a synchronizing signal to the sweep generator. They also drive an amplifier 29 which in turn drives a synchronous motor 30 at a speed corresponding to the fundamental frequency present in the original waveform. The synchronous motor is connected to a pulley 31, which drives the metal tape 15 previously referred to. The angular speed of this pulley likewise corresponds to the aforementioned fundamental modulation frequency.

The metal tape 15 may be constructed of any magnetic material suitable for use in magnetic wire recording devices. It forms a continuous loop, one end of which is passed over the aforesaid driving pulley 31 and the other end of which is passed over a guide pulley 32.

The radius R of the driving pulley 31 is not critical. The distance S, between the two pick-up coils 17 and 18, must, however, be made equal to $2\pi R$, which is the circumference of the driving pulley 31, if the pulley makes one revolution per cycle of the fundamental frequency. However, if pulley 31 is turned at half speed, the distance between coils should be half the circumference of the pulley, and so on.

As has been stated, the driving pulley 31 rotates at a speed dependent on the fundamental frequency F, since this is the predominant frequency present in the waveform being analyzed. In the simplest case, it will go through one revolution during the period of time taken for the said fundamental modulation frequency to go through one cycle of alternation, which means that the moving tape will have travelled in the same period of time the distance S. Successive maxima of the fundamental modulation, as a "magnetic signal" on the tape 15, will be spaced on the said tape a distance S apart. Since the two pick-up coils 17 and 18, are spaced apart by the distance S, the fundamental modulation component of the signal present at coil 17 will be in phase with the fundamental modulation component of the signal present at coil 18. Since the two coils are wound in opposite polarity, when their two voltages are combined in audio amplifier 19, the effect will be a cancellation of the fundamental modulation component of the signal. All higher harmonics of the fundamental frequency will be cancelled out in a like manner.

The subharmonics, or secondary modulation frequencies, will not be so cancelled out. Taking as an example the subharmonic F/2 components of the magnetic signal recorded on the wire will be 180 degrees apart in phase at the coils 17 and 18. The voltage induced at this frequency into coil 18, inverted by the direction in which this coil is wound, will then add to the voltage at this frequency from coil 17, so that in the resultant mixture the subharmonic frequency component will be reinforced rather than cancelled out. In a like manner, it can be shown that the F/3 or F/4 subharmonics, where present, will be reinforced.

The resulting signal from audio amplifier 19 will then be one from which the fundamental modulation frequency and all higher harmonics thereof have been removed, and in which only subharmonics and random unrelated components are present.

By rectifying this filtered waveform and feeding the output through the averaging circuit 21 and to the meter 22, a reading may be obtained proportional to the amplitude of the aggregate of alternating voltages present in audio amplifier 19. Since by far the most significant voltage present therein is the subharmonic frequency of the original signal, the reading of the meter will be in large measure proportional to the amplitude of the said subharmonic or so-called secondary modulation.

As previously stated, the output of audio amplifier 13, which is the source of signal for the magnetic tape, is stabilized by an automatic gain control circuit. The action of this automatic gain control is quite strong, so that the overall amplitude of the signal passed by the audio amplifier 13 will be virtually constant. It will be absolutely true for some phase relationship between the fundamental and subharmonic components, and approximately true for all others, that this overall amplitude so stabilized will be equal to the non-vectorial sum, $A+B$, where A and B are respectively the amplitudes of the fundamental and subharmonic modulation components. The reading of the output meter 22 being proportional to B, will thus be proportional to $$\frac{B}{A+B}$$

in which $A+B=$a constant. For relative values of B and A commonly encountered, this will be approximately equal to $$\frac{B}{A}$$

commonly called the percentage secondary modulation, and the output meter 22 can be so calibrated.

A somewhat more accurate indication of the percentage secondary modulation can be obtained by the oscilloscope presentation. For this indication, the output of the full wave rectifier 20 is fed, as hereinbefore described, to the vertical plates of cathode ray tube 23. The sweep sawtooth for this cathode ray tube is synchronized by pulses 35 from timing circuits 28 at a rate corresponding to the fundamental frequency. Thus any waveform component present in the output of the full wave rectifier 20, which is harmonically related to the said fundamental frequency, including the subharmonic, will appear stationary on the face of the cathode ray tube, and may be separated visually from the other irrelevant and random components which may be present.

The recording tape 15, before passing into the magnetic recording coil 14, passes through a demagnetizing coil 33. The alternating currents present in the said demagnetizing coil 33 are generated by the oscillator 34 and have a frequency of about 30 kilocycles, so that their effect is to wipe clean all magnetic signals previously recorded on the tape 15.

The individual circuits of the boxcar generator 12 may be any of a number of varieties now in use. In one representative variety, a condenser is allowed, during each successive input pulse, to charge or discharge to a value which is equal to the peak value of the pulse, and is prevented by the rectifying action of a diode or gated triode from charging or discharging between pulses. The output voltage taken from the condenser is a series of stairsteps which go up and down as the successive input pulses go higher or lower than those preceding them. After appropriate filtering, this waveform will very closely approximate the envelope of the input pulses. For a detailed account of another type of box car detector, which may be used, reference may be made to a co-pending patent application entitled "Indicator," S. N. 631,948 filed Nov. 30, 1945, in the name of J. L. Lawson, now Patent No. 2,697,782 issued December 21, 1954.

The audio amplifier and automatic gain control 13 comprise circuits which may be identical with those disclosed subsequently in connection with Fig. 2. The timing circuits 26 may also be identical with portions of those disclosed in Fig. 2. The manner in which these circuits function to deliver a clean single-frequency square wave 36 to the amplifier 29, and synchronizing pulses 35 to the sweep generator 27, will be apparent after a study of the circuits in that figure. The amplifier 29 may be identical to that which drives the synchronous motor in Fig. 2. The synchronous motor 30 may be conventional. The recording tape 15 and associated coils 14, 17, 18, and 33, may be of any dimensions and materials suitable for wire and tape recording. The demagnetizing oscillator 34, audio amplifier 19, full-wave rectifier 20, averaging circuit 21, meter 22, and sweep generator 27 may all be conventional.

Figure 2:
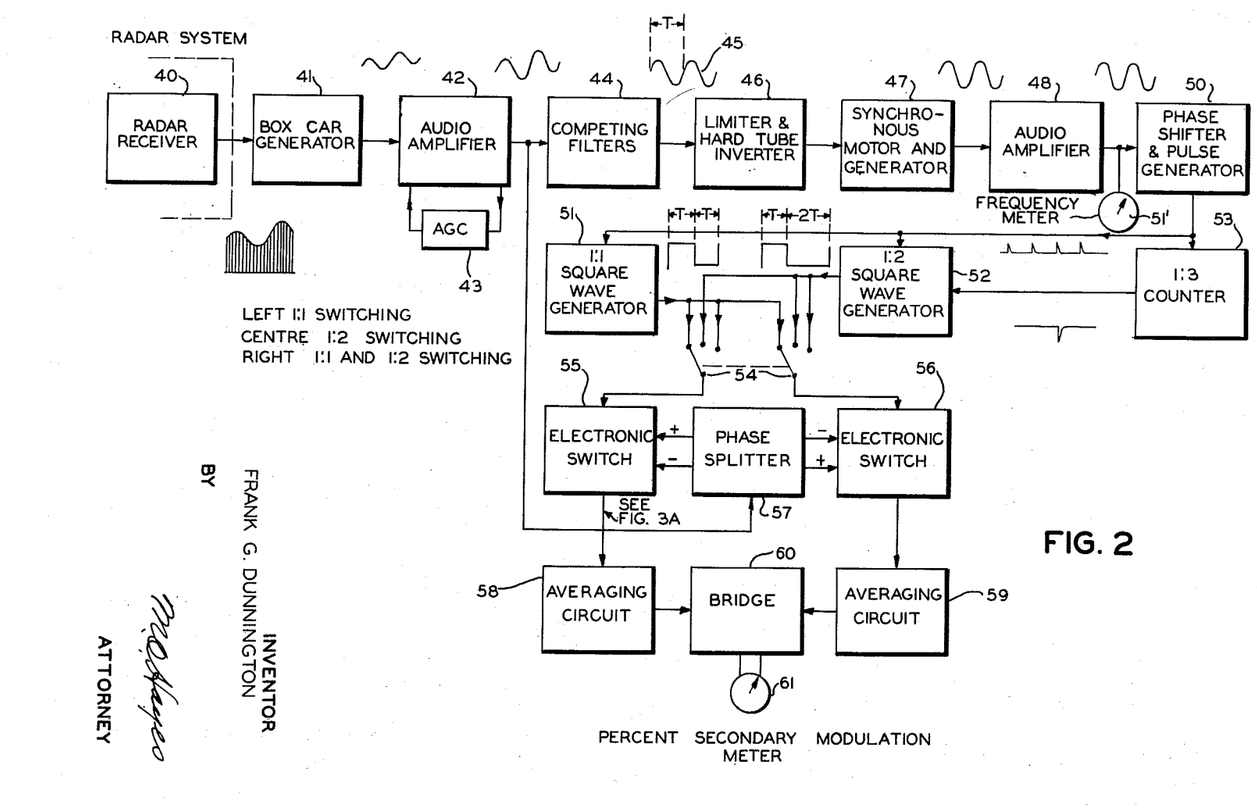
Fig. 2 is a block diagram of another form of this invention.

Coming next to the remaining form of the invention, which is shown in Fig. 2, the basic technique incorporated therein is the combining of the modulation voltages received during one period of the fundamental frequency, F, with the inversion of the modulation voltages received during a successive period or periods of the fundamental frequency, so that voltages of this frequency are cancelled, leaving the voltages of sub-harmonic frequency. In Fig. 2, the modulation frequencies present in the envelope of the echo pulses received by the radar receiver 40 are detected by the box car generator 41, and the resulting output is applied to an audio amplifier 42, controlled by a strong automatic gain control circuit 43. The audio amplifier output is then fed to a set of parallel competing filters 44. These filters are of the band-pass type and are designed to cover the range of fundamental frequencies encountered. Their action is to reject the subharmonic frequencies and reduce the random noise present in the signal.

The filters operate differential relays in such a manner that the output of the filter channel in which the fundamental frequency lies will be automatically selected. This output, 45, containing the fundamental frequency component F, of period T, is next fed to a limiter and hard tube inverter stage 46, which produces the driving signal for the synchronous motor and generator combination 47. The generator voltage output then consists of a practically pure sine wave at the fundamental frequency F. This signal is then applied through the audio amplifier 48 to the phase shifter and pulse generator 50. A frequency meter 51' indicates the fundamental frequency F in cycles per second. The phase shifter is provided to permit manual adjustment of the phase of the signal at this point with respect to that of the subharmonics present in the original input signal.

The pulse generator output, consisting of positive pulses recurring at the fundamental frequency, is applied to the square wave generators 51 and 52. The output of square wave generator 51 is a symmetrical square wave of voltage, whose full period is exactly twice that of the fundamental frequency component. The output of square wave generator 52 is an asymmetrical square wave of voltage. As indicated, the duration of the first half cycle is exactly equal to the period, T, of the fundamental frequency component, while the duration of the succeeding half cycle is exactly equal to twice the period of the fundamental frequency component. Such operation is accomplished by passing the output of the pulse generator 50 to a 1:3 counter 53 which supplies a negative pulse to prevent every third positive pulse from triggering the square wave generator 52. The outputs of both square wave generators are fed to a mechanical selector switch 54 and thus determine the operating condition of the electronic switches 55 and 56.

The output of the audio amplifier 42, which contains the fundamental and subharmonic frequency components, is also applied to the phase splitter 57. From this latter circuit are obtained two signals, each containing the fundamental and subharmonic frequency components. One of these signals retains the same phase as the original input signal; the other signal is inverted with respect to the original input signal. These two signals are both applied through electronic switches 55 and 56 to averaging circuits 58 and 59 whose outputs are connected to the electronic bridge 60.

It will be noted that when the selector switch 54 is in the left hand position the symmetrical output of square wave generator 51 controls or gates both electronic switches 55 and 56. This action will be hereinafter designated as 1:1 switching. With the selector switch 54 in the center position the output of square wave generator 52 gates both electronic switches with the asymmetrical square wave indicated. This action will be hereinafter designated as 1:2 switching. When switch 54 is in the right hand position electronic switch 55 will undergo 1:1 switching and electronic switch 56 1:2 switching.

With switch 54 in the left hand position, electronic switch 55 is made to select alternately the two outputs of the phase splitter 57, first passing for a time T the fundamental and subharmonic frequency components with unchanged phase, and then passing them for a time T with inverted phase. At the output of electronic switch 55 the average value of the fundamental frequency component F will be zero, but the average value of the F/2 subharmonic, if present, will not be zero.

Figure 3:
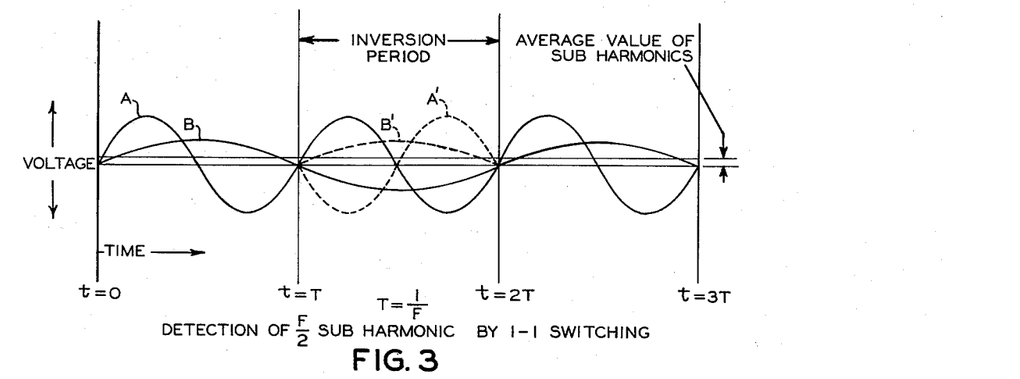
Figs. 3 and 4 illustrate certain voltage waveform relations useful in explaining the principles of the latter form of the invention.

The above action is illustrated in Fig. 3, wherein waveform A represents the fundamental frequency component, F, and waveform B the F/2 subharmonic frequency component. If no inversion were introduced these two components would appear as indicated by the solid line waveforms. Since, however, both components are inverted during the period $t=T$ to $t=2T$ the actual conditions during this inversion period are as indicated by the dotted portions. Considering the resultant components separately it is evident that the time average value of the fundamental frequency is zero, while that of the subharmonic becomes positive as shown. The averaging circuit 58 of Fig. 2 therefore applies a positive D. C. voltage to the bridge 60 whose magnitude depends on the amplitude of the F/2 subharmonic component. A corresponding action occurs in the electronic switch 56 and the averaging circuit 59, resulting in the application of a negative D. C. voltage to the opposite side of the bridge.

Figure 4:
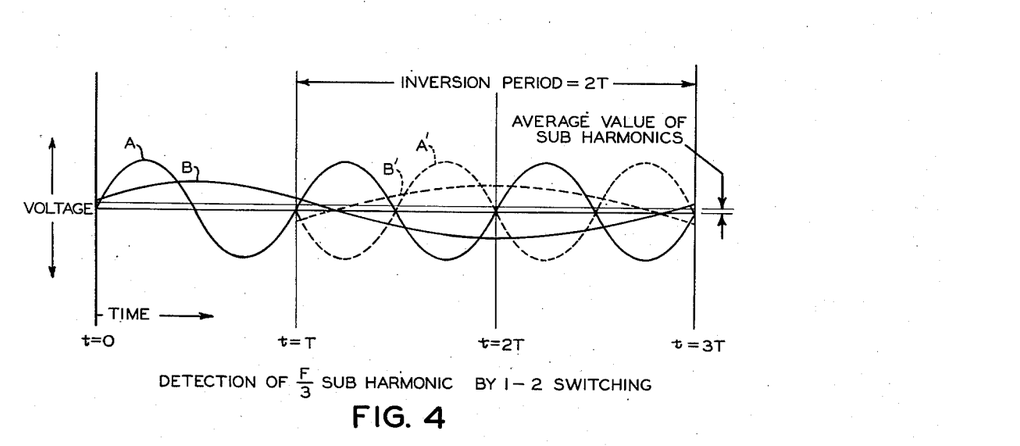

The degree of unbalance caused by this push-pull action is indicated by the meter 61. Since the amplitude of the fundamental component F is held to a fixed voltage by the action of the AGC circuit 43, the meter deflection is approximately proportional to the relative amount of the subharmonic present and can be calibrated in percent of secondary modulation. A similar analysis can be made for the detection of the F/3 subharmonic component. For this case the selector switch 54 must be turned to the center position so that 1:2 switching occurs. As illustrated in Fig. 4 the fundamental frequency F again averages to zero, while the F/3 component does not. If it is desired to have the apparatus prepared to detect either of the F/2 or F/3 components the switch 54 can be placed in the right hand position so that electronic switch 55 undergoes 1:1 switching and electronic switch 56 undergoes 1:2 switching.

A wiring diagram for a portion of Fig. 2 described above, is given in Fig. 5, referring to which, the output of the box car generator (not shown in Fig. 5 but shown in Fig. 2) consisting of the predominant or fundamental modulation frequency and the secondary or subharmonic frequency is applied to terminal 70. This signal is then passed through the audio amplifier comprising tubes 71 and 72 the gain of which is controlled closely by an AGC circuit consisting of tubes 73 and 74 with associated components. The output of the amplifier, stabilized with respect to the amplitude of the fundamental component, is taken from the plate of tube 72 by means of coupling condensers 75 and 76. The signal passes through condenser 75 to a suitable voltage divider comprising resistors 76' and 77 and then to the input terminals of three parallel-connected band pass filters 81, 82, and 83 which reject the propeller modulation subharmonic components usually encountered. The frequency characteristics indicated for these band pass filters were chosen to suit typical aircraft propeller rotation speeds but the invention is not limited to these particular values.

Figure 10:
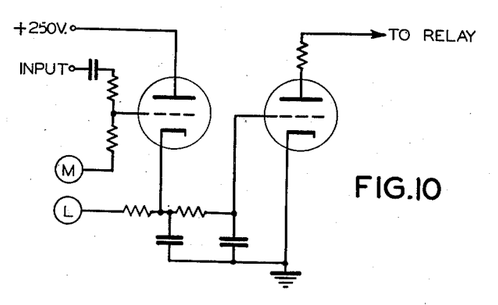
Fig. 10 is a detail of Fig. 5.

If there happen to be signals in all three filter channels a particular one is selected as follows. The filter outputs are fed through suitable rectifiers to energize the differential relay coils 84, 85, 86, and 87. The rectified outputs of filters 81 and 82 are applied to relay coils 84 and 85, respectively, which exert opposing attractive forces on the common movable contact 88. Consequently the filter channel containing the stronger signal is connected to rectifier 90 and differential relay coil 86, competing in like manner with coil 87 receiving any signal from filter 83. The movable contact 91 of this second differential relay is connected to a contact 93 of the selector switch 92. When the selector switch is in this position the strongest fundamental frequency signal is thus automatically chosen for the circuits following. The other contacts of the selector switch permit manual selection of a particular filter channel. Since only one of the filters is used at any one time such an arrangement retains the advantage of a narrow band pass filter in excluding noise at frequencies outside its pass band, and yet the arrangement accommodates a wide range of fundamental frequencies. The band pass filters and the rectifiers may be of conventional design. A typical rectifier circuit for this purpose is shown separately in Fig. 10. Bias at points M and L in Fig. 10 may, if desired, be taken at points M and L in Fig. 5.

Figure 5:
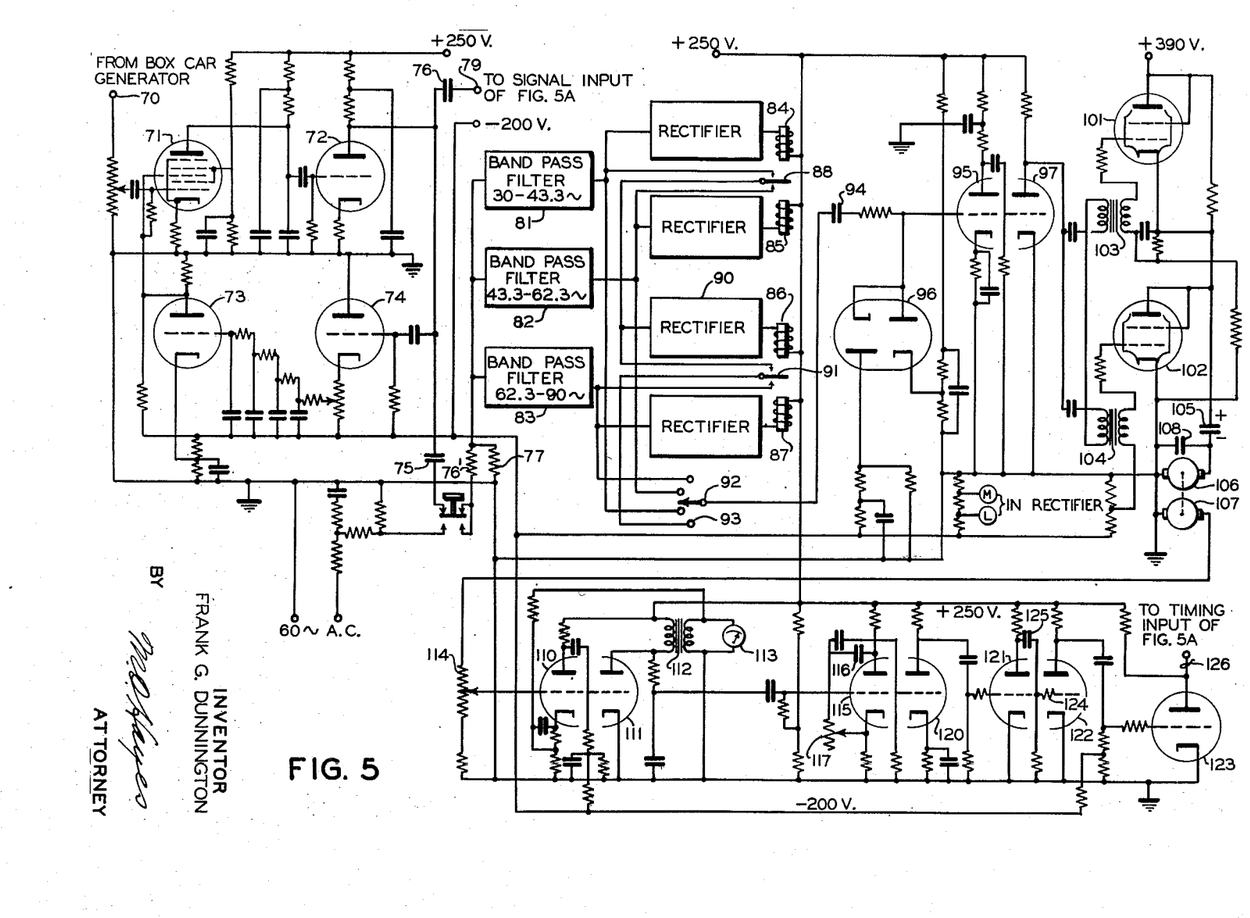
Fig. 5 is a schematic diagram for a portion of the block diagram shown in Fig. 2.

The desired fundamental frequency is coupled via condenser 94 to the grid of amplifier tube 95. The double diode combination 96 connected to this grid limits the positive and negative excursions of the applied signal. This action serves primarily to equalize said positive and negative excursions since the signals will ultimately be used to drive a synchronous motor 106. The amplified signal at the plate of tube 95 is further amplified by tube 97 and applied to the grids of tubes 101 and 102 by transformer coupling. The transformers 103 and 104 are so connected that the hard tube inverters 101 and 102 are driven in push-pull fashion.

The output of tubes 101 and 102 is fed via condenser 105 to the synchronous motor 106 forming part of a motor-generator combination shown schematically as 106, 107. This combination provides additional filtering of the fundamental frequency and also serves as a memory device. Its action may be described as follows. The fundamental frequency is applied to the field winding of synchronous motor 106, whose rotor is mechanically coupled to the input shaft of alternating current generator 107. Motor 106 may be of the clock type. The design of the motor generator combination is such that the frequency of the alternating voltage delivered by the generator is the same as that of the signal driving the synchronous motor. It is evident from the nature of such a device that the generator output will essentially contain only the desired fundamental frequency of the input signal, since the other relatively small frequency components will not affect the average speed of the motor. A flywheel attached to the generator shaft provides inertia for the combination. Hence, if the received propeller modulated radar echo should fade momentarily due to normal signal strength fluctuations the generator would continue to provide an output for the brief period until the signal returns. Thus the device can be said to possess memory for short time intervals. This characteristic permits the circuits following to operate without interruption during conditions of signal fluctuation, and thus provides smoother functioning of the system as a whole.

A further requirement of the synchronous motor-generator combination is that the generator output signal maintain the same time phase as the signal applied to the synchronous motor. An ambiguity would exist in the use of certain conventional synchronous motors. That is, a chance reversal of the phase of the signal applied to the field winding of such a motor would not necessarily influence the phase of the generator output signal. This ambiguity is removed by attaching a small permanent bar magnet to the armature of the synchronous motor. From basic principles, if such a chance phase reversal occurs, the interaction of the magnet with the inverted alternating field of the motor will retard the output shaft until the motor again locks in synchronism. Consequently, the phase of the generator output signal will be correspondingly shifted to agree with that of the input signal. Thus the synchronous motor will lock in only at one point during 360° of the input signal phase.

Condenser 108 is connected across the input terminals of the synchronous motor to convert the square wave output of the inverter to an approximate sine wave and also to provide some power factor correction. It is essential that the inverter circuit be so designed that the motor is permitted to coast when the signal momentarily fades.

The output of the alternating current generator 107 is next amplified by the two stage audio amplifier comprising tubes 110 and 111. Transformer 112 in the plate circuit of tube 111 matches the plate circuit impedance to the impedance of meter 113. A small amount of negative feedback is also taken from this transformer to stabilize the amplifier. The deflection of the meter 113 is proportional to the amplitude of the input signal. Since this amplitude depends on the rotation speed of the generator output signal, the meter 113 can be calibrated directly in cycles per second and hence indicates the particular fundamental frequency received. Potentiometer 114 is used to adjust the meter calibration.

The output of amplifier tube 111 is applied to a conventional phase shifting circuit essentially comprising tube 115, condenser 116 and potentiometer 117. Potentiometer 117 permits adjustment of the phase of the signal at this point with respect to that of the original input signal received from the box car generator 41 of Fig. 2. Such adjustment is necessary to assure proper timing of the square wave generators 51 and 52 of Fig. 2 in gating the input signal in the manner previously described. In the operation of this apparatus the potentiometer 117 should be adjusted for maximum deflection of the meter 61 of Fig. 2 to obtain the true reading. This optimum phase relationship is shown in Figs. 3 and 4. The sinusoidal output wave of the phase shifter of Fig. 5 is next converted to a succession of negative triggers by the overdriven amplifier tubes 120, 121, 122 and 123 in cooperation with the differentiating circuit comprising resistor 124 and condenser 125. Negative pulses are thus obtained at the plate of tube 123, one occurring each cycle of the fundamental frequency. These pulses are used to operate the 1:1 square wave generator and the 3:1 counter circuit previously mentioned. Terminal 126 of Fig. 5 is connected directly to terminal 127 of Fig. 5A.

Figure 5A:
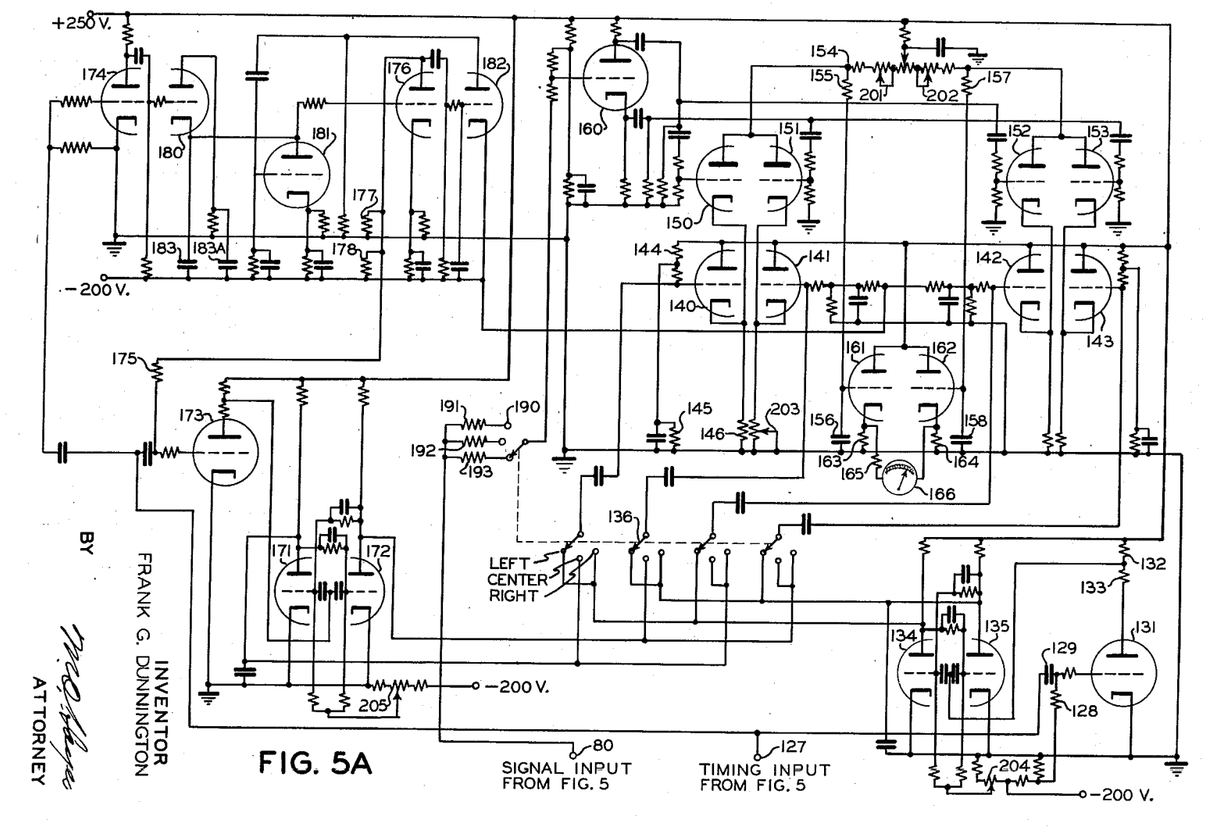
Fig. 5A is a schematic diagram of the remaining portion of Fig. 2.

Referring now to Fig. 5A the negative pulses arriving at terminal 127 are further differentiated by resistor 128 and condenser 129. The resulting positive and negative triggers are fed to the grid of tube 131, which is held beyond cutoff by the bias resistor 128. Negative triggers at the junction of resistors 132 and 133 are used to trigger the square wave generator tubes 134 and 135. These tubes are connected in an Eccles-Jordan type circuit and therefore alternate conduction each time a negative trigger is received. At the plate of tube 134 appears a square wave of frequency such that the one cycle corresponds exactly to two cycles of the fundamental frequency F. The plate of tube 135 yields a similar square wave of opposite polarity. These two square waves are applied via sections of the selector switch 136 to the switch tubes 140, 141, 142 and 143 which in turn operate the switch tubes 150, 151, 152 and 153.

Consider, for example, the action of the square wave on tubes 140 and 150. Assume that prior to the receipt of a negative trigger, tube 134 is non-conducting, and tube 135 is conducting. Tube 140 will be conducting since its grid is returned to a positive voltage at the junctions of resistors 144 and 145. The cathode resistor 146 for this tube is shared by tube 150, whose grid is returned to ground. Current through this resistor from tube 140 will establish a bias sufficient to keep tube 150 from conducting. Thus when tube 140 is "on" tube 150 is held "off." If a negative trigger be now applied to the Eccles-Jordan tubes 134 and 135 conditions will suddenly reverse; tube 140 will be turned "off" by the voltage drop at the plate of tube 134, and tube 150 will be turned "on." Similar reasoning can be applied to the other pairs of switch tubes, the net result being that tubes 150, 153 alternate conduction with tubes 151, 152 each cycle of the fundamental frequency.

The propeller modulation signals at the output of the audio amplifier tube 72 of Fig. 5 are also applied through condenser 76 to terminal 79 which is directly connected to terminal 80 of Fig. 5A. From this point the signals are applied to the phase splitter tube 160 whose cathode and plate outputs are coupled to the switch tubes 150, 151, 152 and 153. Considering tubes 150 and 151 it is evident that the signal at terminal 154 will become inverted on alternate cycles of the fundamental frequency. By the action illustrated in Fig. 3 the F/2 subharmonic, if present, will acquire a direct current component while the fundamental frequency component F will not. Thus the integrator comprising resistor 155 and condenser 156 will apply to the grid of tubes 161 a voltage whose magnitude is proportional to the amplitude of the F/2 subharmonic component. By similar action tubes 152 and 153 will cause the integrator comprising resistor 157 and condenser 158 to apply to the grid of tube 162 a D. C. voltage of opposite polarity whose magnitude is proportional to the amplitude of the F/2 subharmonic component.

Tubes 161 and 162 together with resistors 163, 164 and 165 and the meter 166 form a bridge circuit. If the grids of tubes 161 and 162 are at the same potential, both tubes conduct equally and no current flows through the meter 166. When, however, a subharmonic component is detected in the manner described above, the bridge becomes unbalanced and the meter 166 indicates the degree of unbalance. Since the amplitude of the fundamental frequency component is stabilized by the AGC circuit 43 of Fig. 2, the meter reading is proportional to the percentage of secondary modulation. It is significant that the switching action described also tends to average out random noise components, thereby increasing the sensitivity of the equipment in detecting weak signals.

The foregoing discussion has been concerned with detection of the F/2 subharmonic component. As illustrated in Fig. 4, and previously described, it is necessary to employ an asymmetrical square wave to obtain a D. C. average value for the F/3 subharmonic component. This square wave is developed by the Eccles-Jordan circuit comprising tubes 171 and 172 of Fig. 5A. The required asymmetry is produced by interrupting every third trigger applied to the circuit. Details of this action are as follows. The negative pulses at terminal 127 of Figure 5A are also applied through separate differentiating circuits to the grids of tubes 173 and 174. The grid of tube 173 is returned through resistor 175 to the plate of tube 176 which is held at a negative voltage by the resistors 177 and 178. Hence only the positive portions of the differentiated negative pulses at the grid of tube 173 can produce an output at the plate of this tube. The differentiated negative pulses applied to the grid of tube 174 produce positive pulses at its plate which cause tube 180 to conduct. Tubes 181 and 176 are initially non-conducting due to cathode bias, while tube 182 is initially conducting. Condenser 183 is charged in "steps" above its quiescent charge by successive sharing of charges with condenser 183A caused by the action of the successive positive pulses applied to the in grid of tube 180. The bias of tube 176 is so chosen that this tube conducts only when the charge of condenser 183 has risen three "steps" above its quiescent value. The negative pulse occurring at the plate of tube 176 is inverted by tube 182 and fed back with a slight delay to the grid of tube 181, thus turning it on to discharge condenser 183. The negative pulses at the plate of tube 176 are also applied to the grid of tube 173 and thus prevent every third positive pulse from going through this tube to trigger the Eccles-Jordan circuit. As a result the required asymmetric square waves are applied through the selector switch to the switch tubes, thus causing 1:2 switching. The action of the switch tubes and bridge circuit in detecting the F/3 subharmonic component is analogous to that described for the F/2 subharmonic component.

If the selector switch is placed in the right hand position, one side of the bridge circuit will undergo 1:1 switching and the other 1:2 switching. Consequently the meter 166 will indicate the presence of either the F/2 or F/3 subharmonic components. The selector switch section 190 in combination with resistors 191, and 192, and 193 provides a means of effectively changing the bridge sensitivity to compensate for the difference between the average values of the subharmonic components. The potentiometers 201, 202, and 203 permit adjustment of the bridge circuit to counteract any inherent unbalance due to tube differences and other factors. The 1:1 and 1:2 Eccles-Jordan circuits can also be adjusted for proper balance by means of potentiometers 204 and 205.

All of the embodiments shown are designed to be used in conjunction with a radar search system of standard type. It is desirable, however, that the pulse recurrence frequency of the radar system be "wobbled" over a range of the order of 10 cycles per second, at a "wobbling" frequency of the order of 1 cycle per second. This is a technique which has been used previously in the art of detecting fundamental propeller modulation frequencies in radar pulses. Such a technique is desirable in order to eliminate spurious frequencies resulting from beats between harmonics of the fundamental frequency and the pulse recurrence frequency. This "wobbling" technique is of less importance with the indicator of Fig. 2.

It will be noted that the forms of the invention shown in Figs. 1 and 2 provide quantitative information regarding the presence of fundamental and subharmonic components in a propeller-modulated signal. This enables the operator to determine whether or not the latter component is present in significant amounts, and also to distinguish between the signals returned by specially treated propellers having different numbers of blades. A further advantage lies in the ability of the equipment to provide indications in the presence of considerable noise interference.

Although the form of the invention shown in Fig. 6 yields qualitative rather then quantitative results, and does not possess as high a sensitivity as the other forms, its simplicity facilitates compact light-weight construction suitable for installations in aircraft, for example, as IFF equipment.

It is believed that the circuits of my invention, their operation, and the advantages thereof, will be apparent from the foregoing detailed description. It will also be apparent that while I have shown and described the invention in several preferred forms, changes may be made in the circuits shown without departing from the spirit of the invention, as sought to be defined in the following claims.

What is claimed is:

1. Apparatus for distinguishing between friendly aircraft having one or more but not all propeller blades coated with a material relatively non-reflective to radio waves, and enemy aircraft not having such a propeller coating, said apparatus comprising radio echo detection means to detect aircraft, means to produce a wave corresponding to the modulation envelope of the received echo signals, means to separate the fundamental and subharmonic frequencies in said envelope and an indicator responsive to the presence and coexistence of said fundamental and subharmonic frequencies in order to distinguish between a friendly aircraft and an enemy aircraft.

2. Apparatus for distinguishing between a first aircraft having one or more but not all propellor blades coated with a material relatively nonreflective to radio waves, and a second aircraft not having such propeller coating, said apparatus comprising means to detect echo signals from said aircraft, means producing a voltage wave corresponding to the modulation envelope of the received echo signals, means for separating the fundamental and subharmonic frequencies in said voltage wave, and an indicator responsive to the presence and coexistence of said fundamental and subharmonic frequencies.

3. Apparatus for distinguishing between aircraft having different propeller characteristics, said apparatus comprising, means for directing pulsed electromagnetic energy toward said aircraft, means for receiving signals reflected from said aircraft, means for detecting said received signals to obtain a voltage wave corresponding to the modulation envelope of the received signals, said voltage wave containing frequency components dependent on the characteristics of said propellers, means coupled to said detecting means for separating the frequency components of said wave, and means coupled to and responsive to the output of said separating means for indicating the nature of said frequency components.

4. Apparatus for detecting whether any of the blades of a propeller on a propeller driven aircraft is coated with a material nonreflective to radio waves, said apparatus comprising, means for directing pulsed radio energy to intercept said aircraft, means for receiving signals reflected from said aircraft, means for producing a voltage wave corresponding to the modulation envelope of said received signals, said voltage wave including a fundamental frequency component dependent on the rotational speed of said propeller and subharmonic frequencies dependent on the number of propeller blades being coated as stated hereinabove, means for separating the fundamental and subharmonic components of said wave, and means coupled to and responsive to the output of said separating means for indicating the coexistence and nature of said subharmonic frequencies.

5. Apparatus for distinguishing between an aircraft having one or more but not all propeller blades coated with a material relatively nonreflective to radio waves, and aircraft not having such a propeller coating, said apparatus comprising means for directing pulsed radio energy to intercept said aircraft, means for receiving signals reflected from said aircraft, means for producing a voltage wave corresponding to the modulation envelope of said received signals, the modulation envelope of the received signals from the aforesaid aircraft differing in their frequency components in accordance with the aforesaid characteristics of the propellers, the modulation envelope from both of said aircraft including a fundamental frequency component related to the speed of rotation of their respective propellers and subharmonic components dependent on the presence or absence of said propeller coating, means for eliminating the fundamental frequency component from said modulation envelope thereby leaving the subharmonic components which may be present, and means for indicating the percentage modulation of said envelope by said subharmonic frequency components.

6. Apparatus in accordance with claim 5 wherein said means for eliminating the fundamental frequency from the modulation envelope comprises means for magnetically recording said modulation envelope on a moving recording tape, oppositely connected pick-up coils spaced along the line of travel of said tape, the speed of movement of said tape and the spacing of said pick-up coils being so interrelated that said fundamental frequency component is canceled and subharmonic frequency components are not canceled, a detector connected to said pick-up coils to detect the uncanceled subharmonic components, and wherein said indicating device is connected to said detector for indicating the percentage modulation by said subharmonic components.

7. Apparatus in accordance with claim 5 wherein said means for eliminating the fundamental frequency from said voltage wave comprises means for magnetically recording said modulation envelope on a moving recording tape, oppositely connected pick-up coils spaced along the line of travel of said tape, the rate of movement of said tape and the spacing of said pick-up coils being so interrelated that said fundamental frequency component is canceled and said subharmonic frequency components are not canceled, a detector connected to said pick-up coils to detect the uncanceled subharmonic components, said indicating device being connected to said detector and including an averaging circuit for producing a signal proportional to said subharmonic frequency components, and an output meter coupled to said averaging circuit and calibrated in terms of percentage subharmonic modulation.

8. Apparatus in accordance with claim 5 wherein said means for eliminating the fundamental frequency from said voltage wave comprises means for magnetically recording said modulation envelope on a moving recording tape, oppositely connected pick-up means spaced along the line of travel of said tape, the rate of movement of said tape and the spacing of said pick-up coils being so interrelated that said fundamental frequency component is canceled without the cancellation of said subharmonic frequency components, a detector connected to said pick-up coils to detect the uncanceled subharmonic components, said indicating device being connected to said detector and including a cathode ray tube having two pairs of deflection plates, the output of said detector being applied across one pair of deflection plates, and means for generating a sweep voltage synchronous with said fundamental frequency component, said sweep voltage being applied to the other pair of deflection plates of said cathode ray tube.

9. Apparatus for distinguishing between an aircraft having one or more but not all propeller blades coated with a material relatively nonreflective to radio waves and an aircraft not having such propeller coating, said apparatus comprising means for directing pulsed radio energy to intercept said aircraft, means for receiving signals reflected from said aircraft, means for producing a voltage wave corresponding to the modulation envelope of said received signals, said voltage waves differing in their frequency components in accordance with the aforesaid differences in characteristics of said propellers, each of the voltage waves derived from the reflected signals from the two aircraft including a fundamental frequency component related to the speed of rotation of their propellers and subharmonic components dependent on the presence or absence of propeller coating, means coupled to said voltage wave producing means for canceling the fundamental frequency component from said voltage wave without the cancellation of selected desired subharmonic components which may be present, said last-mentioned means being operable in synchronism with said fundamental frequency component, and means coupled to said last-mentioned means for indicating the content of subharmonic frequency components in said voltage wave.

10. Apparatus in accordance with claim 9 wherein said fundamental frequency component canceling means comprises means operated by said fundamental frequency component for first passing said voltage wave during a time interval proportional to the period of said fundamental frequency component and then inverting said voltage wave during a time interval proportional to said period for canceling said fundamental frequency component but not a desired subharmonic component, a detector coupled to said canceling means to receive the uncanceled subharmonic component, said indicating device being coupled to said detector and indicating the percent modulation produced by said desired subharmonic.

11. Apparatus in accordance with claim 9 wherein said fundamental frequency component canceling means comprises means operated by said fundamental frequency component for generating a square wave voltage signal having half periods which are alternately multiples of the period of said fundamental frequency, electronic switches operated by said square wave voltage signal, means operated by said electronic switches for first passing said voltage wave during a time interval equal to the period of said fundamental frequency, and then inverting said voltage wave during a time interval equal to a selected multiple of said period for canceling said fundamental component but not the subharmonic component which is proportional to said selected multiple, an averaging circuit coupled to said electronic switches for producing a signal proportional to the content of said subharmonic in said voltage wave, and means for indicating the magnitude of said last-mentioned signal.

References Cited in the file of this patent

UNITED STATES PATENTS

| | | |
|---|---|---|
| 1,743,087 | Kingsley | Jan. 7, 1930 |
| 1,954,996 | Hehn | Apr. 17, 1934 |
| 1,981,884 | Taylor et al. | Nov. 27, 1934 |
| 2,005,011 | Specht | June 18, 1935 |
| 2,007,772 | Sams et al. | July 9, 1935 |
| 2,159,790 | Freystedt et al. | May 23, 1939 |
| 2,212,110 | Beuermann | Aug. 20, 1940 |
| 2,407,287 | Labin | Sept. 10, 1946 |
| 2,408,048 | Deloraine | Sept. 24, 1946 |
| 2,450,946 | Evans | Oct. 12, 1948 |
| 2,462,102 | Istvan | Feb. 22, 1949 |
| 2,472,782 | Albersheim | June 14, 1949 |
| 2,491,542 | Woodyard et al. | Dec. 20, 1949 |
| 2,535,274 | Dicke | Dec. 26, 1950 |
| 2,581,847 | Espenschied et al. | Jan. 8, 1952 |